(12) United States Patent
Du et al.

(10) Patent No.: US 11,573,470 B2
(45) Date of Patent: Feb. 7, 2023

(54) DISPLAY PANEL AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Yue Du, Beijing (CN); Yuanhui Guo, Beijing (CN); Lei Guo, Beijing (CN); Ke Dai, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/253,162

(22) PCT Filed: Jun. 30, 2020

(86) PCT No.: PCT/CN2020/099136
§ 371 (c)(1),
(2) Date: Dec. 17, 2020

(87) PCT Pub. No.: WO2021/036487
PCT Pub. Date: Mar. 4, 2021

(65) Prior Publication Data
US 2021/0271141 A1    Sep. 2, 2021

(30) Foreign Application Priority Data
Aug. 23, 2019    (CN) .......................... 201910783886.4

(51) Int. Cl.
*G02F 1/1362*    (2006.01)
*G02F 1/1335*    (2006.01)
(Continued)

(52) U.S. Cl.
CPC ...... *G02F 1/136286* (2013.01); *G02F 1/1347* (2013.01); *G02F 1/133512* (2013.01); *G02F 1/1368* (2013.01)

(58) Field of Classification Search
CPC ......... G02F 1/136286; G02F 1/133512; G02F 1/1347; G02F 1/1368
(Continued)

(56) References Cited

U.S. PATENT DOCUMENTS

2013/0249976 A1    9/2013    Kunieda et al.
2014/0098308 A1    4/2014    Wu et al.
(Continued)

FOREIGN PATENT DOCUMENTS

CN    103210341 A    7/2013
CN    103268044 A    8/2013
(Continued)

*Primary Examiner* — Edward J Glick
*Assistant Examiner* — William D Peterson
(74) *Attorney, Agent, or Firm* — The Webb Law Firm

(57) ABSTRACT

The present disclosure relates to a display panel and a display device. The display panel comprises: a display liquid crystal panel comprising a plurality of sub-pixels defined by a first grid structure and arranged in an array; a dimming liquid crystal panel located on a light incident side of the display liquid crystal panel and stacked with the display liquid crystal panel, the dimming liquid crystal panel comprising a plurality of dimming pixels defined by a second grid structure and arranged in an array; wherein the second grid structure comprises a plurality of shading lines which extend in a waveform along a row direction and have the same period, and a waveform phase difference $\Delta\phi$ of any two adjacent shading lines meets: $0 < |\Delta\phi| < \pi$.

20 Claims, 7 Drawing Sheets

(51) Int. Cl.
*G02F 1/1347* (2006.01)
*G02F 1/1368* (2006.01)

(58) Field of Classification Search
USPC .............................................. 349/74
See application file for complete search history.

(56) References Cited

U.S. PATENT DOCUMENTS

| | | |
|---|---|---|
| 2015/0206501 A1 | 7/2015 | Kurasawa et al. |
| 2016/0054573 A1 | 2/2016 | Kasano et al. |
| 2018/0067578 A1 | 3/2018 | Konoshita et al. |

FOREIGN PATENT DOCUMENTS

| | | | |
|---|---|---|---|
| CN | 104793817 A | | 7/2015 |
| CN | 107797691 A | | 3/2018 |
| CN | 109581728 A | * | 4/2019 |
| CN | 109581728 A | | 4/2019 |
| CN | 210348143 U | | 4/2020 |
| WO | 2014196125 A1 | | 12/2014 |

* cited by examiner

DISPLAY PANEL AND DISPLAY DEVICE

CROSS REFERENCE TO RELATED APPLICATIONS

This application is a U.S. National Stage under 35 U.S.C. § 371 of International Application No. PCT/CN2020/099136, as filed on Jun. 30, 2020, which claims the priority to the Chinese Patent Application No. 201910783886.4 filed on Aug. 23, 2019. The disclosure of each of these applications is incorporated herein by reference in its entirety.

TECHNICAL FIELD

The present disclosure relates to the technology field of display, and in particular, to a display panel and a display device.

BACKGROUND

Among flat panel display devices, liquid crystal display devices have a dominant position in the product market due to their characteristics of small volume, low power consumption, relatively low manufacturing cost, no radiation, and etc. How to improve display quality of the liquid crystal display devices and bring better viewing experience to users is always a key research direction for those skilled in the art.

SUMMARY

According to an aspect of the embodiments of the present disclosure, there is provided a display panel comprising: a display liquid crystal panel, comprising a plurality of sub-pixels defined by a first grid structure and arranged in an array; and a dimming liquid crystal panel, located on a light incident side of the display liquid crystal panel and stacked with the display liquid crystal panel, the dimming liquid crystal panel comprising a plurality of dimming pixels defined by a second grid structure and arranged in an array; wherein the second grid structure comprises a plurality of shading lines which extend in a waveform along a row direction and have the same period, and a waveform phase difference $\Delta\phi$ between any adjacent two of the shading lines meets: $0 < \Delta\phi| < \pi$.

In some embodiments, the shading line extends in a curved waveform or a fold line waveform.

In some embodiments, the shading line extends in a fold line waveform, and includes a plurality of fold line units arranged periodically, wherein each of the fold line units includes two straight line segments symmetrically disposed with a column direction as a symmetry axis.

In some embodiments, both ends of the straight line segment are overlapped with the first grid structure in a direction perpendicular to the display liquid crystal panel.

In some embodiments, intersections of both ends of the straight line segment and the first grid structure are overlapped in a direction perpendicular to the display liquid crystal panel.

In some embodiments, along a column direction, a waveform phase $\Phi_n$ of a nth shading line, a waveform phase $\Phi_{n+1}$ of a (n+1)th shading line and a waveform phase $\Phi_{n+2}$ of a (n+2)th shading line meet: $\phi_{n+1} - \phi_n = \phi_{n+2} - \phi_{n+1} =$; or $\phi_{n+1} - \phi_n = \Delta$, $\phi_{n+2} - \phi_{n+1} = -\Delta\phi$; or $\phi_{n+1} - \phi_n = \Delta\phi$, $\phi_{n+2} - \phi_{n+1} = -2\Delta\phi N$; or $\phi_{n+1} - \phi_n = \Delta\phi$, $\phi_{n+2} - \phi_{n+1} = -\Delta\phi/2$; where n is a positive integer.

In some embodiments, each row of the sub-pixels comprises a plurality of pixel units each of which comprises a first, second and third sub-pixel being different in color and arranged in sequence, and each of the sub-pixels in a same column has a same color; an area of the dimming pixel is not smaller than that of the pixel unit.

In some embodiments, the area of the dimming pixel is approximately four times that of the pixel unit; an absolute value $|\Delta\phi|$ of the waveform phase difference of any adjacent two of the shading lines is $\pi/3$; or the absolute value $|\Delta\phi|$ of the waveform phase difference of any adjacent two of the shading lines is $2\pi/3$.

In some embodiments, the first grid structure comprises: a plurality of first gate lines extending along the row direction, a plurality of first data lines extending along a column direction, and a shading matrix located on a side, away from the dimming liquid crystal panel, of the first gate lines and the first data lines, wherein line widths of the first gate line and the first data line both are smaller than a line width of the shading matrix, and the first gate lines and the first data lines are overlapped with the shading matrix in a direction perpendicular to the display liquid crystal panel.

In some embodiments, the second grid structure further comprises: a plurality of second gate lines extending along the row direction and a plurality of second data lines extending along a column direction, wherein the second gate lines and the second data lines are located on a side, away from the display liquid crystal panel, of the shading lines, a line width of the second gate line is smaller than that of the shading line, and the second gate lines are overlapped with the shading lines in a direction perpendicular to the display liquid crystal panel.

In some embodiments, the second data line extends in a fold line waveform.

In some embodiments, the dimming liquid crystal panel and the display liquid crystal panel are adhered by a transparent optical adhesive; or the dimming liquid crystal panel and the display liquid crystal panel share a same manufacturing substrate on a side close to each other.

According to another aspect of the embodiments of the present disclosure, there is provided a display device comprising the display panel according to any one of the foregoing embodiments.

The display panel according to the embodiments of the present disclosure further improves rainbow stripes on the premise that moire stripes of a display picture are improved, and thus has better display quality.

Other features of the present disclosure and advantages thereof will become apparent from the following detailed description of the embodiments of the present disclosure with reference to the accompanying drawings.

BRIEF DESCRIPTION OF THE DRAWINGS

The accompanying drawings, which constitute a part of this specification, illustrate the embodiments of the present disclosure, and, together with the description, serve to explain the principles of the present disclosure.

The present disclosure may be more clearly understood according to the following detailed description in conjunction with the accompanying drawings, in which.

It should be understood that the sizes of various portions shown in the accompanying drawings are not drawn to actual scale. Further, identical or similar reference numerals are used to refer to identical or similar members.

DETAILED DESCRIPTION

Figure 1:
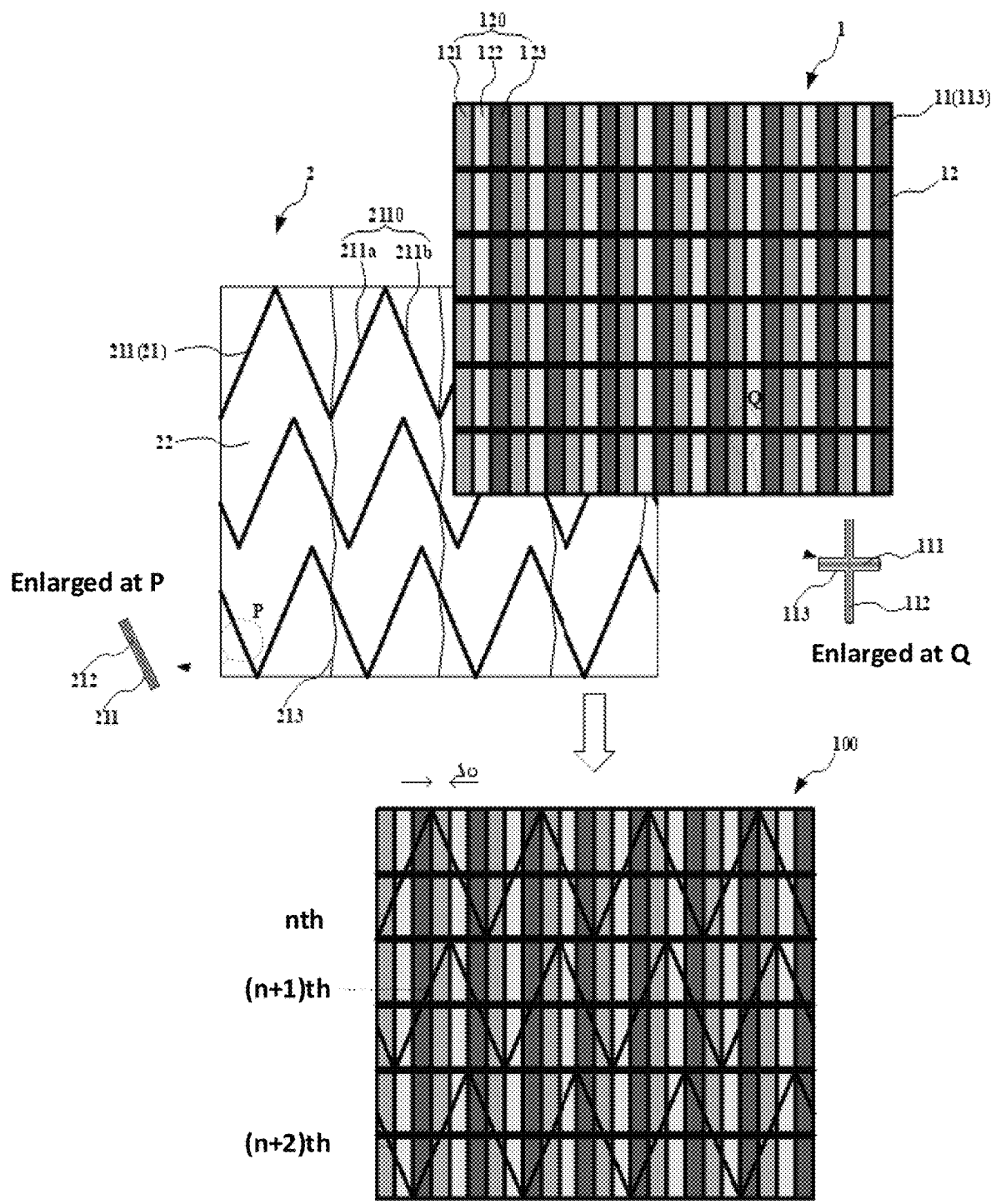
FIG. 1 is a schematic structural diagram of a display panel according to an embodiment of the present disclosure.

Various embodiments of the present disclosure will now be described in detail with reference to the accompanying drawings. The description of the embodiments is merely illustrative and is in no way intended to limit the present disclosure, its application, or uses. The present disclosure may be embodied in many different forms and is not limited to the embodiments described herein. These embodiments are provided for making this disclosure thorough and complete, and sufficiently expressing the scope of the disclosure to those skilled in the art. It should be noted that: the relative arrangement of components and steps set forth in these embodiments is construed to be illustrative only and not restrictive unless otherwise specifically stated.

The words "first," "second," and the like used in this disclosure do not imply any sequence, quantity, or importance, but are merely used to distinguish different portions. The word "comprise" and the like means that an element preceding the word covers the elements listed following the word, and do not preclude the possibility of covering also other elements. The terms "upper", "lower", "left", "right", and the like are merely used for implying relative position relations, and after an absolute position of the object described changes, the relative position relations may possibly change correspondingly.

In the present disclosure, when a specific element is described between a first element and a second element, an intermediate element may exist between the specific element and the first element or the second element, or an intermediate element may not exist.

All terms (including technical or scientific terms) used in this disclosure have the same meanings as understood by one of ordinary skill in the art to which this disclosure belongs unless otherwise specifically defined. It will be further understood that terms defined in common dictionaries, should be interpreted as having meanings consistent with their meanings in the context of the related art but should not be interpreted in an idealized or extremely formalized sense unless expressly defined herein.

Techniques, methods, and apparatus known by one of ordinary skill in the relevant art may not be discussed in detail, but are intended to be regarded as a part of the specification where appropriate.

Currently, what is commonly seen in the market is liquid crystal display devices. A conventional liquid crystal display device generally includes an liquid crystal display panel and a backlight module located on a light incident side of the liquid crystal display panel. The liquid crystal display panel comprises an array substrate and a filtering substrate disposed oppositely to form a liquid crystal cell, a liquid crystal between the array substrate and the filtering substrate, a first polarizer on a side of the array substrate away from the filtering substrate, and a second polarizer on a side of the filtering substrate away from the array substrate, wherein the array substrate is closer to the backlight module than the filtering substrate, and polarization directions of the first and second polarizer are orthogonal. The liquid crystal display panel includes a plurality of pixel units, and each pixel unit includes a plurality of sub-pixels different in color. Sub-pixels of the same pixel unit mix light according to a certain proportion, so as to make the pixel unit display colors visible to human eyes. Such a conventional liquid crystal display device has technical defects of poor picture contrast and dark-state light leakage due to its own structural characteristics.

In order to improve the above-described defects, the related art provides a liquid crystal display device using a dual-panel driving technique. A main difference from the above-described conventional liquid crystal display device is that the display panel thereof includes a dimming liquid crystal panel and a display liquid crystal panel which are stacked, wherein the display liquid crystal panel has a similar structure and operation principle to the above-described liquid crystal display panel, and the dimming liquid crystal panel is located on a light incident side of the display liquid crystal panel and on a light-emitting side of the backlight module, and comprises a plurality of dimming pixels arranged in an array. Each dimming pixel serves as a dimming unit for controlling a direction and intensity of a backlight incident to a respective area of the display liquid crystal panel via the dimming pixel.

The liquid crystal display device of the related art can realize fine area dimming of a picture, and the principle thereof is to adjust light transmission (i.e., a direction and/or intensity of the backlight to be allowed to transmit through) of a respective dimming pixel of the dimming liquid crystal panel according to gray scales of the displayed picture in different areas. For example, for an area with a higher luminance picture, a light transmittance of a respective dimming pixel of the dimming liquid crystal panel is also adjusted to be relatively higher; for an area with a lower luminance picture, the light transmittance of the respective dimming pixel of the dimming liquid crystal panel is also adjusted to be relatively lower; for an area with a black display picture, the light transmittance of the respective dimming pixel of the dimming liquid crystal panel is adjusted to be substantially zero. Compared with the above-mentioned conventional liquid crystal display device, such liquid crystal display device can overcome the defect of dark-state light leakage of the picture, and significantly improve the contrast, thereby bringing better viewing experience for the user. Particularly, when the liquid crystal display device performs HDR (High-Dynamic Range) display, the area dimming makes the luminance range of the picture wider, low gray scale transition more natural, and display effect better.

However, since pixel sizes of the dimming liquid crystal panel and the display liquid crystal panel are in the same order of magnitude, and spatial periods thereof are close to each other, light and dark alternate stripes, i.e., moire stripes, are easily generated on the picture after the dimming liquid crystal panel and the display liquid crystal panel are stacked. The moire stripe is an embodiment of the beat principle.

In order to improve the moire stripes, another related art provides a solution that gate lines extending along the row direction of the dimming liquid crystal panel are designed in a fold line waveform, and are shielded by shading lines with the same form but a larger line width from a side close to the display liquid crystal panel. In such related art, grid forms of the dimming liquid crystal panel and the display liquid crystal panel are obviously different, and the moire stripes are not easy to be perceived by human eyes after stacking, thereby improving or eliminating the moire stripes.

The inventors of the present application found in the research and development of related products that, in the above related art capable of improving moire stripes, colorful stripes, i.e. rainbow stripes, can be seen on the display picture, which still affects the picture quality, resulting in deterioration of the user viewing experience.

The embodiments of the present disclosure provides a display panel and a display device, so as to improve rainbow stripes of the picture of the display device and enhance the display quality of the display device.

As shown in FIG. 1, a display panel 100 according to an embodiment of the present disclosure comprises a dimming liquid crystal panel 2 and a display liquid crystal panel 1 which are stacked, wherein: the display liquid crystal panel 1 comprises a plurality of sub-pixels 12 defined by a first grid structure 11 and arranged in an array; and the dimming liquid crystal panel 2 is located on a light incident side of the liquid crystal display panel 1, and comprises a plurality of dimming pixels 22 defined by a second grid structure 21 and arranged in an array, the second grid structure 21 comprising a plurality of shading lines 211 which extend in a waveform along a row direction and have a same period, and a waveform phase difference $\Delta\Phi$ of any two adjacent shading lines 211 meets: $0<|\Delta\Phi|<\pi$.

The structure and operation principle of the display liquid crystal panel 1 are similar to those of the aforementioned conventional and related arts, and thus are not repeated here. In the embodiments of the present disclosure, as shown by an enlarged view at Q in FIG. 1, the first grid structure 11 includes: a plurality of first gate lines 111 extending along the row direction, a plurality of first data lines 112 extending along a column direction, and a shading matrix 113 located on a side of the first gate lines 111 and the first data lines 112 away from the dimming liquid crystal panel 2, wherein line widths of the first gate line 111 and the first data line 112 are both smaller than that of the shading matrix 113, and the first gate lines 111 and the first data lines 112 are overlapped with the shading matrix 113 in a direction perpendicular to the display liquid crystal panel 1. The line width of the gate line is generally greater than that of the data line, and thus, a line width of a row-direction extending portion of the shading matrix 113 is also generally greater than that of a column-direction extending portion thereof.

It will be understood that, in order to support gray scale display of the sub-pixels 12, a first thin film transistor (not shown in the figure) is further provided corresponding to each sub-pixel 12, wherein the first thin film transistor is disposed at an intersection of the first gate line 111 and the first data line 112. Observed from one light-emitting side of the display liquid crystal panel 1, the first thin film transistor, the first gate line 111, and the first data line 112 are invisible as being shaded by the shading matrix 113.

The dimming pixel 22 is used by the dimming liquid crystal panel 2 as a control unit for area dimming of a picture. As shown in FIG. 1, the dimming pixels 22 of the dimming liquid crystal panel 2 are defined by the second grid structure 21. As shown by an enlarged view at P in FIG. 1, in addition to the above-mentioned shading lines 211, the second grid structure 21 further comprises a plurality of second gate lines 212 extending along the row direction and a plurality of second data lines 213 extending along the column direction. The second gate lines 212 and the second data lines 213 are located on a side of the shading lines 211 away from the display liquid crystal panel 1, the second gate line 212 and the shading line 211 have substantially the same form, but a line width of the second gate line 212 is smaller than that of the shading line 211, and the second gate line 212 and the shading line 211 are overlapped in a direction perpendicular to the display liquid crystal panel 1. Observed from a light-emitting side of the dimming liquid crystal panel 2, the second gate lines 212 are invisible as being shaded by the shading lines 211. In addition, a line width of the second data line 213 is much smaller than that of the second gate line 212, which substantively will not cause a light leakage between adjacent dimming pixels, thus the second data line 213 does not need to be shaded in the dimming liquid crystal panel 2. The second data line 213 may extend in a straight line form or a fold line waveform as shown in the figure. The second data line 213 is designed to extend in a fold line waveform, which makes the difference between the first grid structure 11 and the second grid structure 21 more obvious and therefore eliminates moire stripes more favorably.

The main layer structure of the dimming liquid crystal display panel 2 includes an array substrate and an opposite substrate disposed oppositely to form a liquid crystal cell, a liquid crystal disposed between the array substrate and the opposite substrate, wherein the opposite substrate is closer to the display liquid crystal panel than the array substrate. The structure of the liquid crystal cell of the dimming liquid crystal panel 2 is similar to that of the display liquid crystal panel 1, but a filtering layer is not required on the dimming liquid crystal panel 2. The second gate line 212 and the second data line 213 are disposed on the array substrate, and in order to control the dimming pixels 22, a second thin film transistor (not shown in the figure) is provided corresponding to each dimming pixel 22, wherein the second thin film transistor is disposed at an intersection of the second gate line 212 and the second data line 213. The shading line 211 may be disposed on the opposite substrate.

A specific form of the shading line 211 of the dimming liquid crystal panel 2 is not limited, for example, the shading line 211 may extend in a curved waveform or a fold line waveform as shown in the figure, and both make can well eliminate moire stripes.

In the embodiment shown in FIG. 1 of the present disclosure, the shading line 211 is designed to extend in a fold line waveform so as to reduce an overlapping area of the shading line 211 and the sub-pixel 12 as much as possible and to increase an aperture ratio of the sub-pixel 12, based on the principle that a straight line between two points is the shortest. The shading line 211 includes a plurality of fold line units 2110 which are periodically arranged, and each fold line unit 2110 includes two straight line segments 211a and 211b which are symmetrically disposed with the column direction as a symmetry axis. In some embodiments of the present disclosure, both ends of the straight line segments 211a and 211b are overlapped with the first grid structure 11 in the direction perpendicular to the display liquid crystal panel 1, respectively. In order to facilitate the design of the second data lines 213 and eliminate moire stripes better, the intersections of both ends of each straight line segment of the shading lines 211 and the first grid structure 11 are overlapped in the direction perpendicular to the display liquid crystal panel 1.

As shown in FIG. 1, each row of sub-pixels 12 of the display liquid crystal panel 1 includes a plurality of pixel units 120, and each pixel unit 120 includes a first sub-pixel 121, a second sub-pixel 122, and a third sub-pixel 123, which are different in color and arranged in sequence, and each sub-pixel located in the same column has the same color. The resolution of the dimming pixels 22 may be designed according to the fineness requirement for area dimming. In the embodiments of the present disclosure, an area of the dimming pixel 22 is not smaller than that of the pixel unit 120. For example, in some embodiments, the area of the dimming pixel is approximately four times that of the pixel unit. In some other embodiments, the area of the dimming pixel is approximately 16 times that of the pixel unit. In still other embodiments, the area of the dimming pixel is approximately 1.5 times that of the pixel unit. An area ratio of the dimming pixel to the pixel unit can be designed to be other values, which are not listed herein. In view of specific structures and manufacturing tolerances of the first grid structure 11 and the second grid structure 21, the term "approximately" should be understood to be within a certain tolerance in the present disclosure.

Figure 2A:
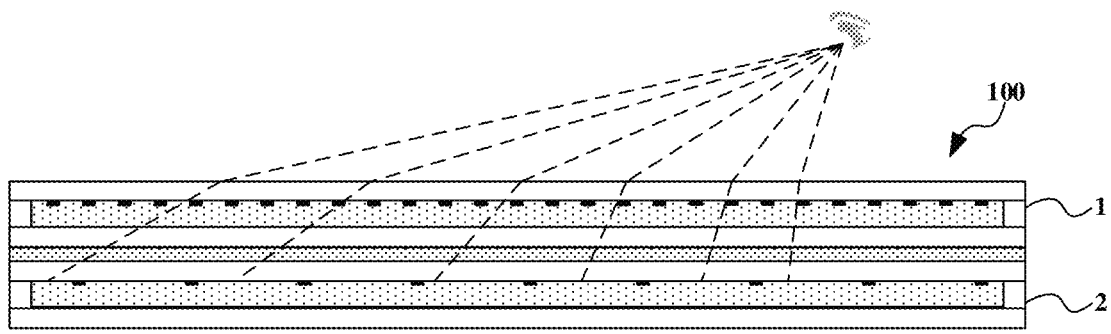
FIG. 2a is a schematic diagram illustrating visual dislocation of a display panel viewed by human eyes at different viewing angles.

As shown in FIG. 2a, since a human eye resembles a light receiver, different regions of a picture are viewed at different viewing angles. When the human eye views the display panel 100, because the dimming liquid crystal panel 1 and the display liquid crystal panel 2 are stacked to have a certain thickness, and different materials have different refractive indexes, pixel images of both panels will generate visual dislocation at different viewing angles, and the greater the difference between the viewing angles, the more obvious the visual dislocation.

Figure 2B:
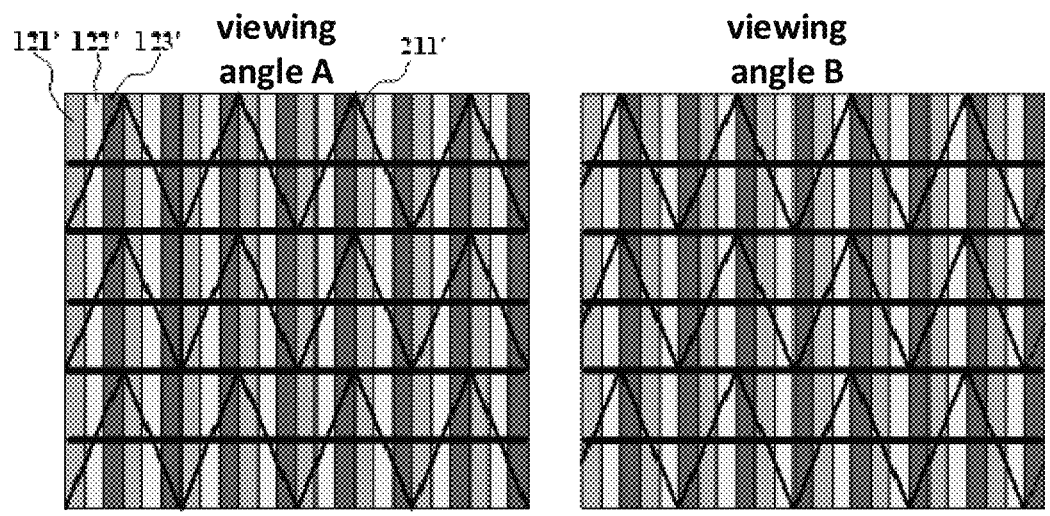
FIG. 2b is a comparison diagram of display pictures in the related art viewed by human eyes from viewing angles A and B in a corresponding area.

FIG. 2b is a comparison diagram of a display picture of a related art, viewed from viewing angles A and B by human eyes in a corresponding area. In the related art, phases of adjacent shading lines 211' are the same, that is, wave crests of the adjacent shading lines 211' are located on the same column direction line, and wave troughs thereof are on the same column direction line. In view of a line width difference between a row-direction extending portion and a column-direction extending portion of the shading matrix of the display liquid crystal panel, it can be seen from the figure that, at the viewing angle A, the human eyes perceive more overlapping area of a shading line 211' with a red first sub-pixel 121' and a blue third sub-pixel 123' in the corresponding area, and less overlapping area with a green second sub-pixel 122', and thus, the color of the area is greenish as a whole in the human eyes. However, at the viewing angle B, due to the existence of visual dislocation, the shading line 211' perceived by the human eyes in the corresponding area is deviated to the left by a width of about one sub-pixel, so that the human eyes perceive more overlapping area of the shading line 211' with the blue third sub-pixel 123' and the green second sub-pixel 122', and less overlapping area with the red first sub-pixel 121', and thus, the color of the area is reddish as a whole in the human eyes. When the human eyes look at the two areas simultaneously, fluctuation of color temperatures in the two areas can be obviously perceived, and therefore rainbow stripes are perceived.

With the technical solutions of the embodiments of the present disclosure, since the dislocation design is adopted between the adjacent shading lines of the second grid structure, and a phase difference between waveforms is more than 0 and less than π, the respectively overlapping areas of several adjacent shading lines with the first, second and third sub-pixel are basically even as a whole, and color temperatures of different areas of the display panel are basically consistent. At different viewing angles, although the visual dislocation still exists, obvious fluctuation of the color temperatures cannot be perceived by the human eyes, and therefore, the rainbow stripes are effectively improved.

In the embodiment shown in FIG. 1, an overlapping area of a nth shading line with the first sub-pixel 121 and the third sub-pixel 123 is more, and an overlapping area with the second sub-pixel 122 is less; an overlapping area of a (n+1)th shading line with the first sub-pixel 121 and the second sub-pixel 122 is more, and an overlapping area with the third sub-pixel 123 is less; and an overlapping area of a (n+2)th shading line with the second sub-pixel 122 and the third sub-pixel 123 is more, and an overlapping area with the first sub-pixel 121 is less. The three shading lines have substantially the same overlapping area with the first sub-pixel 121, the second sub-pixel 122, and the third sub-pixel 123 as a whole. The color temperatures of different areas of the display panel are basically consistent, so that the rainbow stripes are effectively improved.

In one embodiment of the present disclosure, an absolute value $|\Delta\phi|$ of a waveform phase difference of any two adjacent shading lines is a fixed value, for example, $|\Delta\phi|$ is $\pi/3$ or $2\pi/3$, and the waveform phase difference of two adjacent shading lines is substantially equal to the width of one or two sub-pixels. In this way, the arrangement design of the shading lines is rather regular, and a manufacturing process thereof is simple and easy to implement.

As shown in FIG. 1, in the embodiment of the present disclosure, along the column direction, waveform phases of the nth shading line, the (n+1)th shading line and the (n+2)th shading line, $\Phi_n$, $\Phi_{n+1}$, $\Phi_{n+2}$, meet: $\phi_{n+1}-\phi_n=\phi_{n+2}-\phi_{n+1}=\Delta\phi$, $0<\Delta\phi<\pi$. The respectively overlapping areas of the three adjacent shading lines with the first sub-pixel 121, the second sub-pixel 122, and the third sub-pixel 123 are substantially even as a whole.

Figure 3:
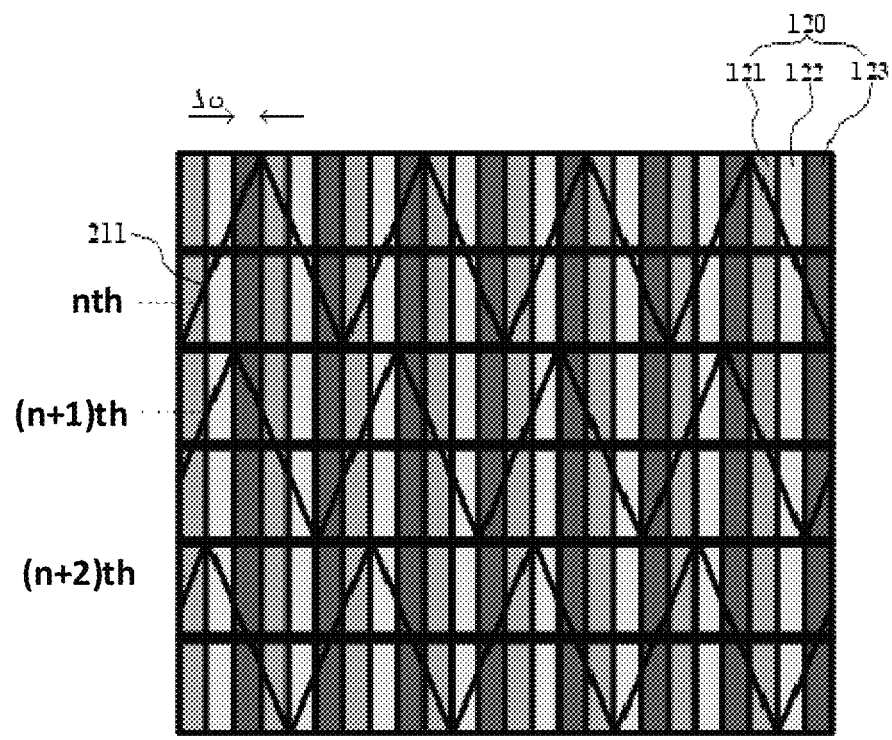
FIG. 3 is a partial front view of a display panel according to another embodiment of the present disclosure.

As shown in FIG. 3, in another embodiment of the present disclosure, along the column direction, waveform phases of the nth shading line, the (n+1)th shading line and the (n+2)th shading line, $\Phi_n$, $\Phi_{n+1}$, $\Phi_{n+2}$, meet: $\phi_{n+1}-\phi_n=\phi_{n+2}-\phi_{n+1}=\Delta\phi$, $-\pi<\Delta\phi<0$. The respectively overlapping areas of the three adjacent shading lines with the first sub-pixel 121, the second sub-pixel 122, and the third sub-pixel 123 are substantially even as a whole.

Figure 4:
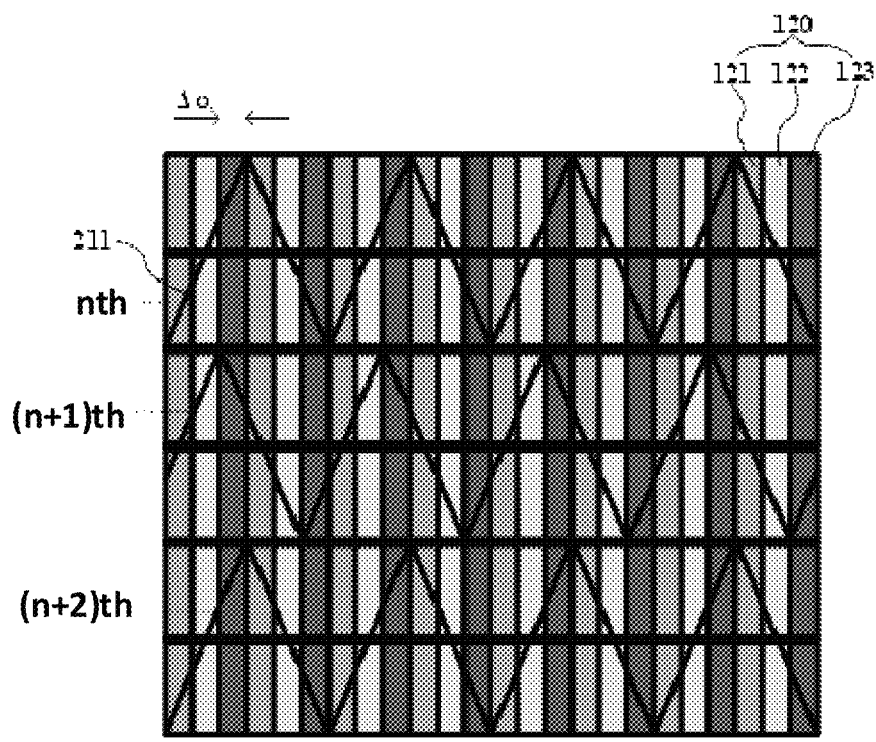
FIG. 4 is a partial front view of a display panel according to still another embodiment of the present disclosure.

As shown in FIG. 4, in a further embodiment of the present disclosure, along the column direction, waveform phases of the nth shading line, the (n+1)th shading line and the (n+2)th shading line, $\Phi_n$, $\Phi_{n+1}$, $\Phi_{n+2}$, meet: $\phi_{n+1}-\phi_n=\Delta\phi$, $\phi_{n+2}-\phi_{n+1}=-\Delta\phi$, $-\pi<\Delta\phi<0$. The respectively overlapping areas of the two adjacent shading lines with the first sub-pixel 121, the second sub-pixel 122, and the third sub-pixel 123 have a reduced difference as a whole, compared with that of the related art, which can improve rainbow stripes to a certain extent.

Figure 5:
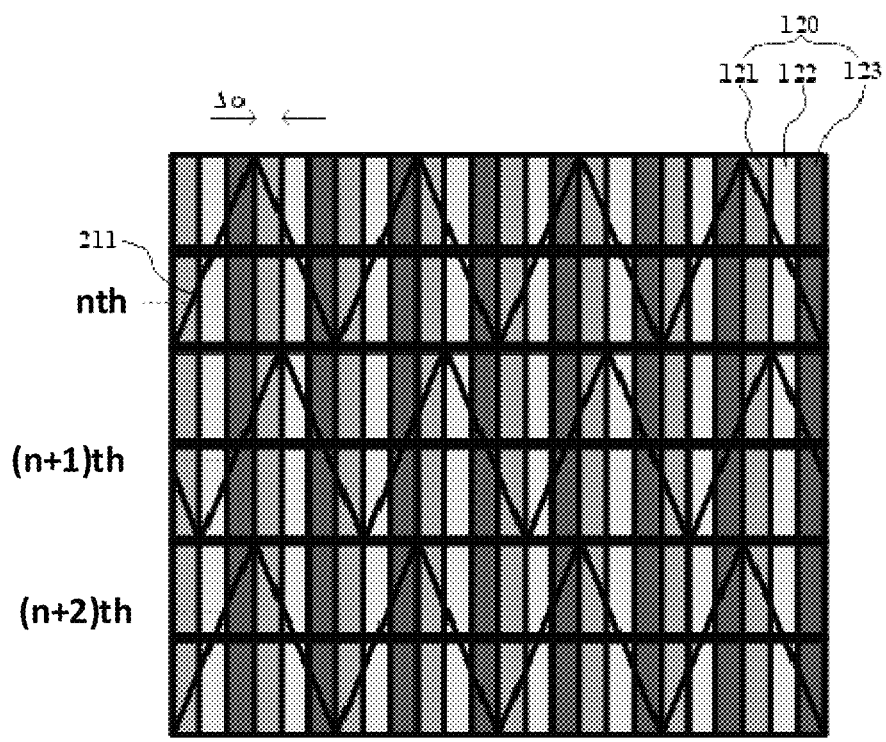
FIG. 5 is a partial front view of a display panel according to further an embodiment of the present disclosure.

As shown in FIG. 5, in a further embodiment of the present disclosure, along the column direction, waveform phases of the nth shading line, the (n+1)th shading line and the (n+2)th shading line, $\Phi_n$, $\Phi_{n+1}$, $\Phi_{n+2}$, meet: $\phi_{n+1}-\phi_n=\Delta\phi$, $\phi_{n+2}-\phi_{n+1}=-\Delta\phi$, $0<\Delta\phi<\pi$. The respectively overlapping areas of the two adjacent shading lines with the first sub-pixel 121, the second sub-pixel 122, and the third sub-pixel 123 have a reduced difference as a whole, compared with that of the related art, which can improve rainbow stripes to a certain extent.

Figure 6:
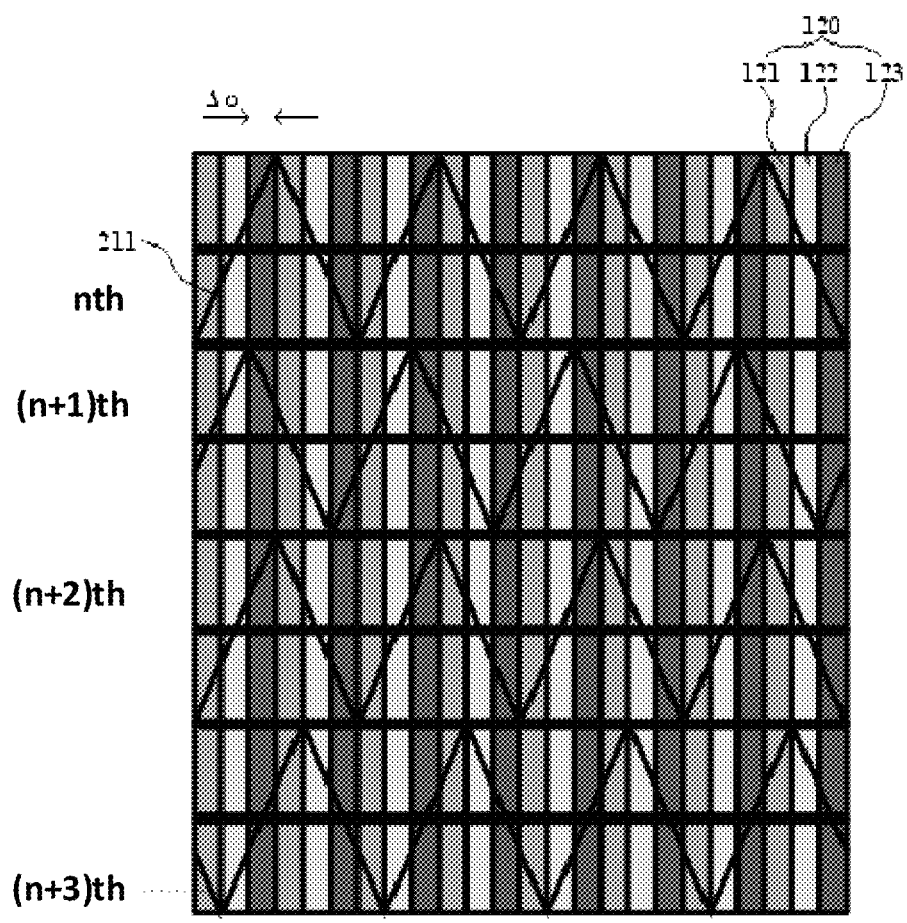
FIG. 6 is a partial front view of a display panel according to further an embodiment of the present disclosure.

As shown in FIG. 6, in a further embodiment of the present disclosure, along the column direction, waveform phases of the nth shading line, the (n+1)th shading line, the (n+2)th shading line and the (n+3)th shading line, $\Phi_n$, $\Phi_{n+1}$, $\Phi_{n+2}$, $\Phi_{n+3}$, meet: $\phi_{n+1}-\phi_n=-\Delta\phi$, $\phi_{n+2}-\phi_{n+1}=\Delta\phi$, $\phi_{n+3}-\phi_{n+2}=\Delta\phi$, $0<\Delta\phi<\pi$. The respectively overlapping areas of the four adjacent shading lines with the first sub-pixel 121, the second sub-pixel 122, and the third sub-pixel 123 are substantially even as a whole.

It should be noted that, in some other embodiments of the present disclosure, the absolute value $|\Delta\Phi|$ of the waveform phase difference of any two adjacent shading lines may not be identical.

Figure 7:
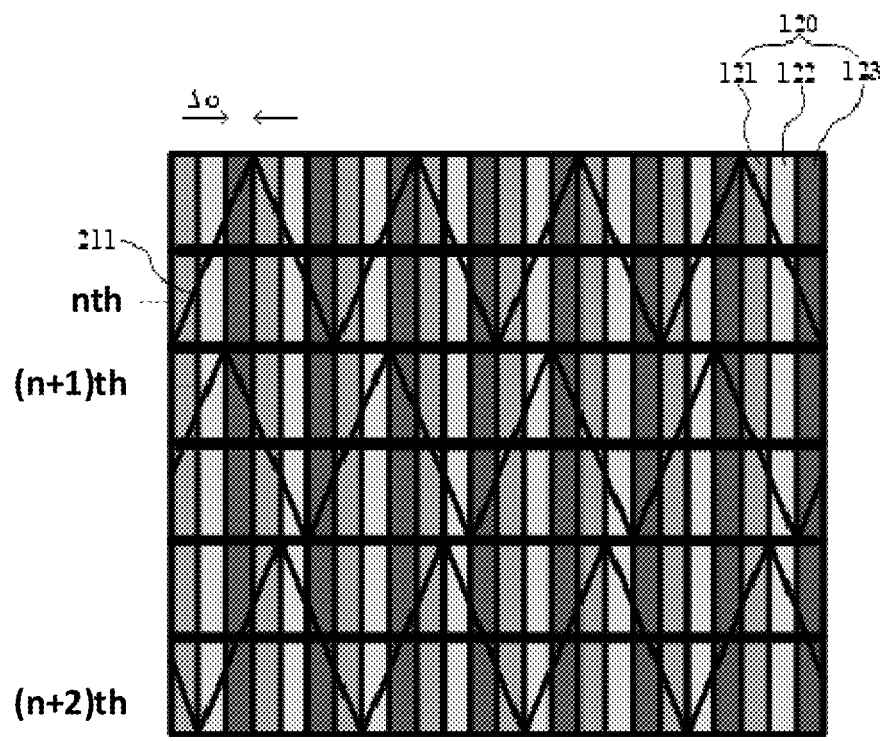
FIG. 7 is a partial front view of a display panel according to further an embodiment of the present disclosure.

As shown in FIG. 7, in still another embodiment of the present disclosure, along the column direction, waveform phases of the nth shading line, the (n+1)th shading line and the (n+2)th shading line, meet: $\phi_{n+1}-\phi_n=\Delta\phi$, $\phi_{n+2}-\phi_{n+1}=-2\Delta\phi$, (or $\phi_{n+2}-\phi_{n+1}=-\Delta\phi/2$). The respectively overlapping areas of the three adjacent shading lines with the first sub-pixel 121, the second sub-pixel 122, and the third sub-pixel 123 are substantially even as a whole.

Figure 8:
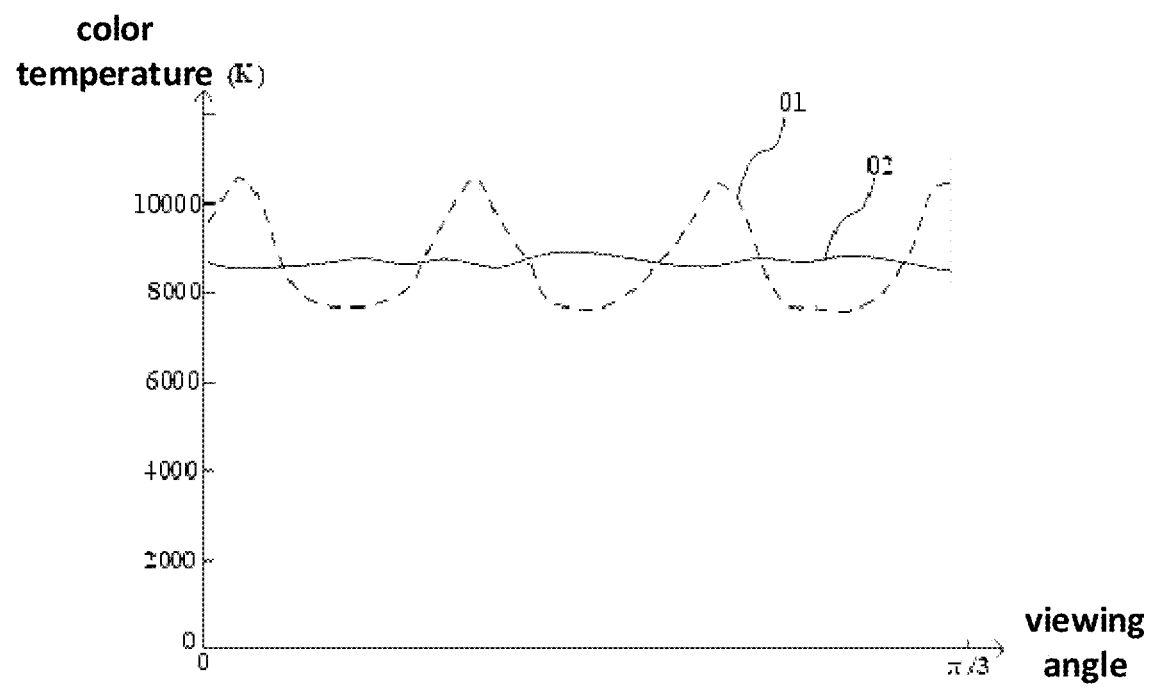
FIG. 8 is a comparison diagram of color temperature simulation curves of a display panel of an embodiment of the present disclosure and a display panel of the related art.

The inventors of the present application performed color temperature simulations on 65-inch display panel products using two structures of FIGS. 1 and 2b, respectively, and comparison results are shown in FIG. 8, wherein a curve 01 is a curve of the color temperature simulation of the related art shown in FIG. 2b, and a curve 02 is a curve of the color temperature simulation of the embodiment shown in FIG. 1 of the present disclosure. It can be seen that, with the change of viewing angles of human eyes, the fluctuation of the color temperature curve of the display panel of the related art is obvious, with a range of about 3000 k, whereas the color temperature curve of the display panel of the embodiment of the present disclosure is smoother, with a range of about 300 k. The fluctuation of a color temperature of a picture can directly reflect rainbow stripes presented, and compared with the related art, the fluctuation range of the color temperature of the display panel of the embodiment of the present disclosure is smaller, the rainbow stripes basically cannot be perceived by human eyes, and therefore display picture quality is obviously improved.

Figure 9A:
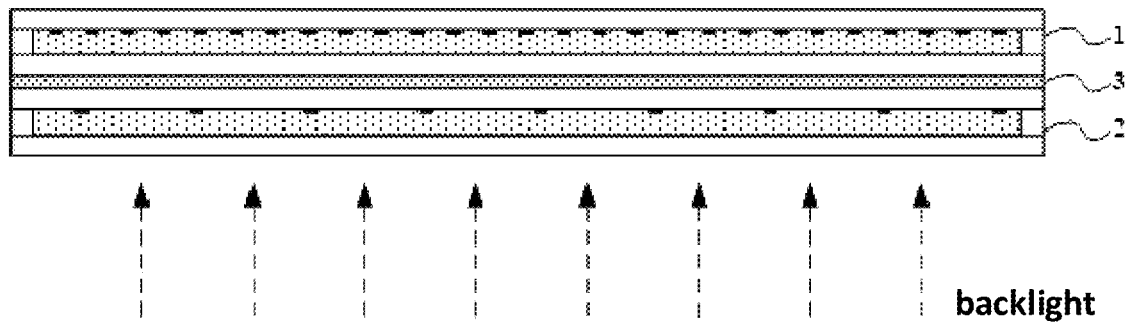
FIG. 9a is a schematic cross-sectional view of a display panel according to an embodiment of the present disclosure.
Figure 9B:
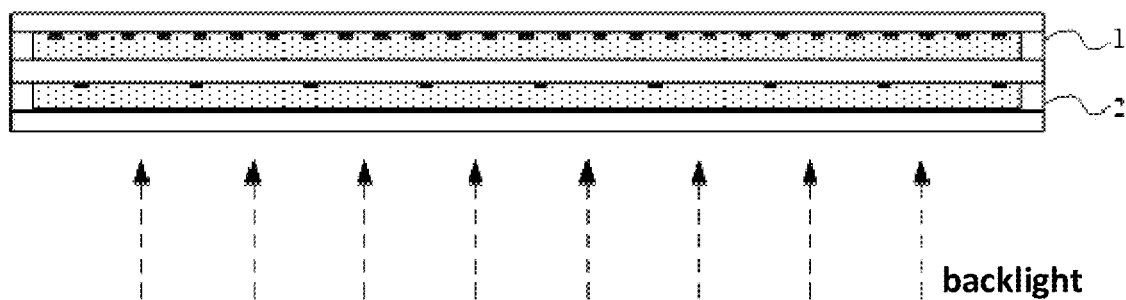
FIG. 9b is a schematic cross-sectional view of a display panel according to another embodiment of the present disclosure.

In one embodiment of the present disclosure, as shown in FIG. 9a, the dimming liquid crystal panel 2 and the display liquid crystal panel 1 are adhered by a transparent optical adhesive 3, which is simple in manufacturing process and easy to maintain. In some other embodiments, as shown in FIG. 9b, the dimming liquid crystal panel 2 and the display liquid crystal panel 1 may also share the same manufacturing substrate on one side adjacent to each other, which is beneficial to reduce the thickness of the display panel and manufacturing costs.

The embodiments of the present disclosure further provide a display device comprising the display panel of any one of the foregoing embodiments. The display device can realize fine area dimming of a picture, with excellent contrast and effectively improved Moire stripes and rainbow stripes of the picture, therefore the picture quality is higher, thereby remarkably improving user experience. The specific product type of the display device is not limited, and may be, for example, a display, a tablet computer, a notebook computer, a television set, an ATM apparatus, an electronic paper, a display screen, and the like.

Although some specific embodiments of the present disclosure have been described in detail with examples, it should be understood by those skilled in the art that the above examples are for illustration only and are not intended to limit the scope of the present disclosure. It will be appreciated by those skilled in the art that modifications can be made to the above embodiments without departing from the scope and spirit of the present disclosure. The scope of the present disclosure is defined by the attached claims.

What is claimed is:

1. A display panel, comprising:
   a display liquid crystal panel comprising a plurality of sub-pixels defined by a first grid structure and arranged in an array, the plurality of sub-pixels comprise a plurality of first sub-pixels, a plurality of second sub-pixels and a plurality of third sub-pixels; and
   a dimming liquid crystal panel located on a light incident side of the display liquid crystal panel and stacked with the display liquid crystal panel, the dimming liquid crystal panel comprising a plurality of dimming pixels defined by a second grid structure and arranged in an array;
   wherein the second grid structure comprises a plurality of shading lines which extend in a waveform along a row direction and have the same period, and a waveform phase difference $\Delta\varphi$ of any adjacent two of the shading lines meets: $0<|\Delta\varphi|<\pi$, so that respective overlapping areas of a first sub-pixel, a second sub-pixel and a third sub-pixel with a shading line are not the same, but respective overlapping areas of first sub-pixels, second sub-pixels and third sub-pixels with adjacent shading lines are basically even as a whole.

2. The display panel according to claim 1, wherein: the shading line extends in a curve waveform or a fold line waveform.

3. The display panel according to claim 1, wherein: the shading line extends in a fold line waveform, and includes a plurality of fold line units arranged periodically each of which includes two straight line segments symmetrically disposed with a column direction as a symmetry axis.

4. The display panel according to claim 3, wherein: both ends of the straight line segment are overlapped with the first grid structure in a direction perpendicular to the display liquid crystal panel.

5. The display panel according to claim 3, wherein: intersections of both ends of the straight line segment and the first grid structure are overlapped in a direction perpendicular to the display liquid crystal panel.

6. The display panel according to claim 1, wherein: along a column direction, a waveform phase $\Phi_n$ of a nth shading line, a waveform phase $\Phi_{n+1}$ of a (n+1)th shading line and a waveform phase $\Phi_{n+2}$ of a (n+2)th shading line meet:

$\varphi_{n+1}-\varphi_n=\varphi_{n+2}-\varphi_{n+1}=\Delta\varphi$; or $\varphi_{n+1}-\varphi_n=\Delta\varphi$, $\varphi_{n+2}-\varphi_{n+1}=-\Delta\varphi$; or $\varphi_{n+1}-\varphi_n=\Delta\varphi$, $\varphi_{n+2}-\varphi_{n+1}=-2\Delta\varphi$; or $\varphi_{n+1}-\varphi_n=\Delta\varphi$, $\varphi_{n+2}-\varphi_{n+1}=-\Delta\varphi/2$;

where n is a positive integer.

7. The display panel according to claim 6, wherein:
   each row of the sub-pixels comprise a plurality of pixel units each of which comprises a first sub-pixel, a second sub-pixel and a third sub-pixel being different in color and arranged in sequence, and each of the sub-pixels in a same column has the same color; and
   an area of the dimming pixel is not smaller than that of the pixel unit.

8. The display panel according to claim 7, wherein:
   the area of the dimming pixel is approximately four times that of the pixel unit; and an absolute value |Δφ| of the waveform phase difference of any adjacent two of the shading lines is π/3; or the absolute value |Δφ| of the waveform phase difference of any adjacent two of the shading lines is 2π/3.

9. The display panel according to claim 1, wherein:
the first grid structure comprises: a plurality of first gate lines extending along the row direction, a plurality of first data lines extending along a column direction and a shading matrix located on one side, away from the dimming liquid crystal panel, of the first gate lines and the first data lines, wherein line widths of the first gate line and the first data line both are smaller than that of the shading matrix, and the first gate lines and the first data lines are overlapped with the shading matrix in a direction perpendicular to the display liquid crystal panel.

10. The display panel according to claim 1, wherein:
the second grid structure further comprises: a plurality of second gate lines extending along the row direction and a plurality of second data lines extending along a column direction, wherein the second gate lines and the second data lines are located on one side, away from the display liquid crystal panel, of the shading lines, a line width of the second gate line is smaller than that of the shading line, and the second gate lines are overlapped with the shading lines in a direction perpendicular to the display liquid crystal panel.

11. The display panel according to claim 10, wherein: the second data line extends in a fold line waveform.

12. The display panel according to claim 1, wherein: the dimming liquid crystal panel and the display liquid crystal panel are adhered by a transparent optical adhesive; or the dimming liquid crystal panel and the display liquid crystal panel share a same manufacturing substrate on one side close to each other.

13. A display device comprising the display panel according to claim 1.

14. The display device according to claim 13, wherein: the shading line extends in a curve waveform or a fold line waveform.

15. The display device according to claim 13, wherein: the shading line extends in a fold line waveform, and includes a plurality of fold line units arranged periodically each of which includes two straight line segments symmetrically disposed with a column direction as a symmetry axis.

16. The display device according to claim 15, wherein:
both ends of the straight line segment are overlapped with the first grid structure in a direction perpendicular to the display liquid crystal panel.

17. The display device according to claim 15, wherein:
intersections of both ends of the straight line segment and the first grid structure are overlapped in a direction perpendicular to the display liquid crystal panel.

18. The display device according to claim 13, wherein:
along a column direction, a waveform phase $\Phi_n$ of a nth shading line, a waveform phase $\Phi_{n+1}$ of a (n+1)th shading line and a waveform phase $\Phi_{n+2}$ of a (n+2)th shading line meet:

$$\varphi_{n+1}-\varphi_n=\varphi_{n+2}-\varphi_{n+1}=\Delta\varphi; \text{ or}$$

$$\varphi_{n+1}-\varphi_n=\Delta\varphi, \varphi_{n+2}-\varphi_{n+1}=-\Delta\varphi; \text{ or}$$

$$\varphi_{n+1}-\varphi_n=\Delta\varphi, \varphi_{n+2}-\varphi_{n+1}=-2\Delta\varphi; \text{ or}$$

$$\varphi_{n+1}-\varphi_n=\Delta\varphi, \varphi_{n+2}-\varphi_{n+1}=-\Delta\varphi/2;$$

where n is a positive integer.

19. The display device according to claim 18, wherein:
each row of the sub-pixels comprise a plurality of pixel units each of which comprises a first sub-pixel, a second sub-pixel and a third sub-pixel being different in color and arranged in sequence, and each of the sub-pixels in a same column has the same color; and an area of the dimming pixel is not smaller than that of the pixel unit.

20. The display device according to claim 19, wherein:
the area of the dimming pixel is approximately four times that of the pixel unit; and an absolute value |Δφ| of the waveform phase difference of any adjacent two of the shading lines is π/3; or the absolute value |Δφ| of the waveform phase difference of any adjacent two of the shading lines is 2π/3.

* * * * *